Patented Jan. 18, 1949

2,459,740

UNITED STATES PATENT OFFICE 2,459,740

METHOD OF MAKING AND COMPOUNDING SYNTHETIC RUBBER

Robert L. Bebb, Akron, Ohio, assignor to The Firestone Tire & Rubber Company, Akron, Ohio, a corporation of Ohio No Drawing. Application April 15, 1944, Serial No. 531,299

4 Claims. (Cl. 260—93)

This invention relates to synthetic rubber, and relates especially to a method of making a synthetic rubber having new and useful properties, and to the product of said method.

Heretofore, synthetic rubbers of the butadiene type, such as polybutadiene, butadiene-styrene copolymers and butadiene-acrylonitrile copolymers, were generally prepared by coagulating a latex of the rubber by means of sodium chloride, alcohol, or by freezing the latex. The resulting coagula were generally stiff and very difficult to process by means of conventional rubber processing machinery. As a result of this situation, several expedients were tried, none of which proved to be commercially satisfactory.

One expedient consisted in heating a dried coagulum for several hours at an elevated temperature in an oven with access to air, in order to increase the plasticity of the rubber to the point at which it could be processed. Other proposals included mixing a catalytic agent, such as phenylhydrazine, with the synthetic rubber in order to cause chemical depolymerization of the rubber to increase its plasticity to a workable figure. These proposals generally proved to be too expensive, dangerous (especially in the use of toxic hydrazines), or resulted in a final synthetic rubber composition having inferior physical properties.

It is an object of the present invention to provide an improved synthetic rubber of the above general type, having improved processing characteristics and resulting in vulcanizates having improved physical properties.

Another object is to provide a synthetic rubber containing a new and useful compounding ingredient.

Another object is to provide a synthetic rubber having unusually high elongation in the vulcanized state.

Another object is to provide a method of manufacturing a synthetic rubber having the above-enumerated desirable characteristics.

The above and further objects will be manifest in the description of the invention which follows.

The present invention accomplishes the objects thereof by simultaneously forming a synthetic rubber coagulum and precipitating therein a novel compounding ingredient which operates to improve the processing characteristics of the coagulum and to modify the physical characteristics of vulcanizates resulting therefrom. The method of the invention broadly comprises the step of treating an aqueous dispersion of the synthetic rubber, containing as a dispersing agent a soluble salt of a fat acid, with a dilute aqueous solution of an aluminum salt. This process step results in the immediate coagulation of the rubber in the dispersion and the precipitation in the said coagulum of a reaction product of the aluminum salt and the fat acid salt. The distribution of this reaction product is substantially uniform throughout the synthetic rubber coagulum.

The synthetic rubber latex from which the product of the invention is derived, is preferably produced by polymerizing an aqueous emulsion of a butadiene hydrocarbon, alone or in the presence of a polymerizable olefin. Examples of butadiene hydrocarbons are butadiene, isoprene, piperylene and dimethyl butadiene. Examples of polymerizable olefins are styrene, acrylonitrile, methyl vinyl ketone and methyl methacrylate. The aqueous emulsion contains as a dispersing agent a soluble salt of a fat acid. The latex resulting from such polymerization is then mixed with a dilute solution of an aluminum salt, with concurrent agitation of the mixture, in order to produce the desired synthetic rubber coagulum. The latter is then separated from the aqueous liquor and dried by suitable means, such as an oven (not shown).

Suitable fat acid salts include the sodium, potassium or ammonium salts of oleic, stearic, palmitic, lauric or other saturated or unsaturated aliphatic monocarboxylic acids which occur in fats in the form of their glyceryl esters. Mixtures of these acids, may also be used.

The aluminum salts contemplated are aluminum sulfate, aluminum chloride and other water soluble aluminum salts. Certain alums such as potassium aluminum sulfate may be used, but these are not as efficient as, e. g., aluminum sulfate. Preferably, the aluminum salt solution contains the salt in a concentration of 0.5 to 10 per cent.

The aluminum salt, as is mentioned above, is bifunctional, in that it causes the immediate coagulation of the synthetic rubber from its dispersion and it also reacts with the soluble soap present in the dispersion to produce in the rubber coagulum a desirable compounding ingredient. This interaction with the soap may be represented by the following series of reactions, in which aluminum sulfate is shown reacting with sodium oleate:

$$Al_2(SO_4)_3 + 6C_{17}H_{33}COONa \rightarrow 2Al(C_{17}H_{33}COO)_3 + 3Na_2SO_4$$

$$2Al(C_{17}H_{33}COO)_3 + (H_2O) \rightarrow Al(OH)_{1.5}(C_{17}H_{33}COO)_{1.5} + 1.5C_{17}H_{33}COOH + Al(OH)_3$$

Thus it is seen that the reaction product forming the novel compounding ingredient for the synthetic rubber consists of a mixture of a basic aluminum salt of a fat acid, fat acid, and aluminum hydroxide. The above indicated proportions of these three ingredients are considered to be approximately accurate for average conditions, but the proportions may vary, depending upon the concentration of the reagents, the temperature of the solutions, and other factors. The resulting compounding ingredient always includes a substantial amount of a basic aluminum salt of a fat acid.

The following examples are presented for the purpose of disclosing the invention in detail, and are not to be considered as limiting the invention solely thereto.

*Example 1*

Fifty grams of butadiene were emulsified in 30 ml. of 10% aqueous sodium stearate solution containing 1 gram of diazoaminobenzene as a catalyst. This mixture was placed in a bomb and shaken at room temperature. At the end of the polymerization period the reaction mixture was found to be in the form of a stable latex. A slight excess of a 4% aqueous solution of aluminum sulfate was added gradually to the latex with rapid stirring of the latter, to cause the immediate coagulation of the synthetic rubber. The rubbery product was found to have desirable physical properties, including sufficient plasticity to allow it to be processed in standard rubber apparatus.

*Example 2*

An aqueous soap solution was prepared by dissolving 0.7 part of sodium hydroxide in water, mixing this solution with 4.8 parts of oleic acid and diluting the resulting soap solution with further water until about 200 parts of water had been used. The soap solution was placed in an autoclave and agitated therein during the addition of 74 parts of butadiene and 26 parts of styrene to form an emulsion. To the emulsion there were added 0.1% of a polymerization catalyst of the oxidizing type and 0.5% of a mercaptan of the type disclosed in Wollthan et al., 2,281,613, these percentages being based upon the weight of the combined monomers. The emulsion was stirred in the autoclave and heated therein for 25 hours at 50° C. The synthetic rubber latex so produced was separated from unreacted monomers by conventional methods and then coagulated by the gradual addition thereto, with agitation, of a slight excess of 4% aqueous solution of aluminum sulfate. The coagulated synthetic rubber was washed and dried and found to amount to 70 parts (70% yield). This butadiene-styrene copolymer was found to be adapted to ready milling and extrusion in regular rubber equipment. Vulcanizates prepared from a copolymer of this type were found to possess substantially greater resistance to blowout than vulcanizates prepared from rubbers produced from similar latices by coagulation with alcohol or sodium chloride. Also, the type of coagulum prepared according to this example was found to produce tire treads having longer lives at high temperatures than treads similarly produced by such other rubbers produced by different methods of coagulation.

*Example 3*

A soap solution was prepared from 0.72 part of sodium hydroxide, 5.2 parts of oleic acid and 200 parts of water. This solution was stirred in an autoclave with 75 parts of butadiene and 25 parts of acrylonitrile to form an emulsion. A small amount of an oxidizing catalyst was added and the mixture was stirred and heated at about 50° C. for 16 hours. The resulting latex was coagulated by rapid mixing with a dilute solution of an aluminum salt, as in the previous examples. The coagulum was obtained in a yield of 65%. The rubber product was found to have much better processing characteristics than previous copolymers of this type, being readily milled and mixed with compounding ingredients to form stocks which were easily molded or extruded.

It has been found that the product of the invention has, in the vulcanized state, a greater elongation than an analogous synthetic rubber produced by former methods of coagulation. This characteristic has led to the preferential use of the present product, for example, in synthetic rubber inner tubes. Tubes of butadiene-styrene copolymer produced by use of an aluminum salt coagulant have proved to be superior on drop-center rims to tubes of conventional copolymers of this type.

It is apparent that the present invention produces a novel type of synthetic rubber having superior processing characteristics and giving rise to vulcanized compositions of improved properties. Synthetic rubber heretofore produced by coagulation of soap-containing latices by means of a coagulant such as alcohol contained varying proportions of soap. Although the soap speeded up the cure of such synthetic rubbers, it imparted relatively low resistance to blowouts and unsatisfactory life to the cured or vulcanized compositions. The present invention prevents the retention of any free water soluble soaps in the synthetic rubber produced by means of the present process. The absence of soap and/or the presence in the synthetic rubber of the reaction product of an aluminum salt and a fat acid appear to explain why the product of the present method possesses improved processing properties, and the vulcanized product possesses improved elongation properties and better blowout resistance.

The invention is especially useful in the production of rubber tire treads and other portions of pneumatic tires. The invention has also been found especially useful in producing a most desirable type of rubber for solid synthetic rubber bogie rollers for military tanks, in that the bogie rollers utilizing the present type of rubber last longer than competitive rubbers, especially when all-metal tracks are employed on the tanks. The invention is also useful in producing general types of synthetic rubber, especially of the butadiene type and the butadiene-styrene and butadiene-acrylonitrile varieties.

Modification may be resorted to and details and proportions varied without departing from the spirit of the invention and the scope thereof as defined in the appended claims.

What is claimed is:

1. A method of making synthetic rubber having improved processing characteristics and adapted to form vulcanizates having increased blowout resistance, which includes mixing a 0.5 to 10 per cent aqueous solution of a soluble aluminum salt with an aqueous dispersion of a synthetic rubber of the group consisting of a rubbery polymer of a butadiene, a rubbery copolymer of butadiene and styrene, and a rubbery copolymer of butadiene and acrylonitrile, and dispersion containing as a dispersing agent a soluble soap selected from the group consisting of sodium oleate and sodium stearate, whereupon the aluminum salt coagulates the synthetic rubber and reacts with the soluble soap to form a reaction product distributed through the synthetic rubber coagulum, thereafter separating the wet coagulum from the aqueous liquor accompanying same and drying the wet coagulum to retain said reaction product uniformly distributed throughout the dried synthetic rubber.

2. A method of making synthetic rubber having improved processing characteristics and adapted to form vulcanizates having increased blowout resistance, which includes mixing a 0.5 to 10 per cent aqueous solution of a soluble aluminum salt with an aqueous dispersion of a rubbery polymer of butadiene, said dispersion containing as a dispersing agent a soluble soap selected from the group consisting of sodium oleate and sodium stearate, whereupon the aluminum salt coagulates said rubbery polymer and reacts with the soluble soap to form a reaction product distributed through the rubbery coagulum, thereafter separating the wet coagulum from the aqueous liquor accompanying same, and drying the wet coagulum to retain said reaction product uniformly distributed throughout the dried rubbery polymer.

3. A method of making synthetic rubber having improved processing characteristics and adapted to form vulcanizates having increased blowout resistance, which includes mixing a 0.5 to 10 per cent aqueous solution of a soluble aluminum salt with an aqueous dispersion of a rubbery copolymer of butadiene and styrene, said dispersion containing as a dispersing agent a soluble soap selected from the group consisting of sodium oleate and sodium stearate, whereupon the aluminum salt coagulates said rubbery copolymer and reacts with the soluble soap to form a reaction product distributed through the rubbery coagulum, thereafter separating the wet coagulum from the aqueous liquor accompanying same and drying the wet coagulum to retain said reaction product uniformly distributed throughout the dried rubbery copolymer.

4. A method of making synthetic rubber having improved processing characteristics and adapted to form vulcanizates having increased blowout resistance, which includes mixing a 0.5 to 10 per cent aqueous solution of a soluble aluminum salt with an aqueous dispersion of a rubbery copolymer of butadiene and acrylonitrile, said dispersion containing as a dispersing agent a soluble soap selected from the group consisting of sodium oleate and sodium stearate, whereupon the aluminum salt coagulates said rubbery copolymer and reacts with the soluble soap to form a reaction product distributed through the rubbery coagulum, thereafter separating the wet coagulum from the aqueous liquor accompanying same, and drying the wet coagulum to retain said reaction product uniformly distributed throughout the dried rubbery copolymer.

ROBERT L. BEBB.

REFERENCES CITED

The following references are of record in the file of this patent:

UNITED STATES PATENTS

| Number | Name | Date |
| --- | --- | --- |
| 2,228,270 | Hopff | Jan. 14, 1941 |
| 2,232,515 | Arnold et al. | Feb. 18, 1941 |
| 2,305,007 | Hopff | Dec. 15, 1942 |
| 2,325,984 | Sarbach | Aug. 3, 1943 |
| 2,378,693 | Fryling | June 19, 1945 |

OTHER REFERENCES

Mueller, India Rubber World, October 1942, pp. 33 to 35 and 41.

Certificate of Correction

Patent No. 2,459,740. January 18, 1949.

ROBERT L. BEBB

It is hereby certified that error appears in the printed specification of the above numbered patent requiring correction as follows:

Column 5, line 12, claim 1, for the words "and dispersion" read *said dispersion*; and that the said Letters Patent should be read with this correction therein that the same may conform to the record of the case in the Patent Office.

Signed and sealed this 16th day of August, A. D. 1949.

[SEAL]

THOMAS F. MURPHY,
*Assistant Commissioner of Patents.*